United States Patent [19]

Bodenstein et al.

[11] Patent Number: 5,080,912
[45] Date of Patent: Jan. 14, 1992

[54] CHEESE PRODUCT AND PROCESS FOR PREPARING SUCH

[75] Inventors: Dieter Bodenstein, Waltenhofen, Fed. Rep. of Germany; Ralph van Daal, Rockanje; Lim Torenvliet, Heijningen, both of Netherlands

[73] Assignee: Van den Bergh Foods Co., Division of Conopco, Inc., Lisle, Ill.

[21] Appl. No.: 477,777

[22] Filed: Feb. 9, 1990

[30] Foreign Application Priority Data

Feb. 13, 1989 [EP] European Pat. Off. ............ 89200351

[51] Int. Cl.$^5$ .......................... A23C 19/00; A23C 19/09
[52] U.S. Cl. .......................................... 426/33; 426/36; 426/40; 426/607; 426/608; 426/658; 426/582
[58] Field of Search ................... 426/33, 36, 40, 602, 426/658, 582, 606–608

[56] References Cited

U.S. PATENT DOCUMENTS

| | | | |
|---|---|---|---|
| 3,164,477 | 1/1965 | Nobile | 426/40 |
| 3,278,313 | 10/1966 | Rhodes | 426/33 |
| 3,600,186 | 8/1971 | Mattson et al. | 426/603 |
| 4,005,195 | 1/1977 | Jandacek . | |
| 4,005,196 | 1/1977 | Jandacek et al. . | |
| 4,034,083 | 7/1977 | Mattson . | |

FOREIGN PATENT DOCUMENTS

| | | |
|---|---|---|
| 0233856 | 8/1987 | European Pat. Off. . |
| 0235836 | 9/1987 | European Pat. Off. . |
| 0236288 | 9/1987 | European Pat. Off. . |
| 0271963 | 6/1988 | European Pat. Off. . |
| 0304130 | 2/1989 | European Pat. Off. . |

Primary Examiner—Marianne Cintins
Attorney, Agent, or Firm—Gerard J. McGowan, Jr.

[57] ABSTRACT

The present invention is concerned with a process for preparing a cheese product containing polyol fatty acid polyesters, having the following steps:

(a) preparing a water and oil containing mixture comprising from 1.2–40 wt. % oil, by combining a fatty composition containing at least 40% polyol fatty acid polyesters by weight of oil with an aqueous composition, (b) homogenizing said mixture so as to obtain a filled milk having an average oil droplet size of less than 20 microns, (c) preparing a cheese milk by combining the filled milk of step (b) and an aqueous composition containing at least 2 wt. % milk protein, (d) adding a starter culture and/or coagulant to the cheese milk and leaving it to coagulate, (e) optionally cutting the coagulum to provide curd particles in whey, and (f) separating the whey from the curd.

18 Claims, No Drawings

CHEESE PRODUCT AND PROCESS FOR PREPARING SUCH

The present invention is concerned with a process for preparing a cheese product from filled milk containing from 1.2–40 wt. % oil. Here by a filled milk is meant a water-continuous composition containing dispersed oil of non-dairy origin, i.e. not derived from milk or a milk product. Although, according to normal terminology an aqueous composition comprising 40 wt. % of oil would rather be referred to as a filled cream, the term filled milk as used in the application also covers filled creams comprising as much as 40 wt. % of oil.

Similarly the term cheese milk, whenever referred to in this document, encompasses cheese milk compositions containing up to 40 wt. % oil. By the term cheese milk as used here, is meant a filled milk which is to be coagulated and further processed to a cheese product.

Polyol fatty acid polyesters, and in particular, the sugar fatty acid polyesters, such as e.g. the sucrose fatty acid polyesters, are known as suitable low-calorie fat-replacers in edible products. Substantially indigestible for human beings they have physical and organoleptic properties very similar to triglyceride oils and fats conventionally used in edible products. Polyol fatty acid polyesters are also reported to have use as pharmaceutical agents e.g. in view of their ability to take up fat-soluble substances, such as in particular cholesterol, in the gastro-intestinal tract, and subsequently remove those substances from the human body. Accordingly, it is attractive to replace at least part of the fat in edible fat-containing products by polyol fatty acid polyesters.

Edible fat-containing products comprising indigestible polyol fatty acid polyesters, are described in eg U.S. Pat. Nos. 3,600,186, 4,005,195, 4,005,196, 4,034,083 and EP Pat. Publ. Nos. 0 233 856, 0 236 288, and 0 235 836.

We have found that cheese products containing a substantial amount of indigestible polyol fatty acid polyesters, displaying excellent texture, structure and flavour, can be prepared by first preparing a filled milk containing polyol fatty acid polyesters, subsequently preparing a cheese milk by admixing the filled milk and an aqueous composition containing at least 2 wt. % milk protein, coagulating the cheese milk, optionally cutting the coagulated product and separating whey and curd.

Accordingly, in a first aspect, the present invention relates to a process for preparing a cheese product containing polyol fatty acid polyesters, comprising the following steps:

(a) preparing a water and oil containing mixture comprising from 1.2–40 wt. % oil, by combining a fatty composition containing at least 40% polyol fatty acid polyesters by weight of oil with an aqueous composition, (b) homogenizing said, mixture so as to obtain a filled milk having an average oil droplet size of less than 20 microns, (c) preparing a cheese milk by combining the filled milk of step (b) and an aqueous composition containing at least 2 wt. % milk protein, (d) adding a starter culture and/or coagulant to the cheese milk and leaving it to coagulate (e) optionally cutting the coagulum to provide curd particles in whey, and (f) separating the whey from the curd.

The present process offers the advantage that it enables the preparation of cheese products wherein a substantial amount of milk fat has been replaced by polyol fatty acid polyesters without any significant adverse effect on the quality of the final product. We have found that even when a substantial amount of milk fat is replaced by polyol fatty acid polyester, cheese products of an exceptionally good quality can be obtained if, in the preparation of the cheese milk, it is ensured that a substantial amount of the milk protein is incorporated under conditions of minimal shear. Thus it is the object of the invention to prepare a cheese milk containing dispersed polyol fatty acid polyester, whilst avoiding that all milk protein present therein are subjected to conditions of high shear.

In order to prepare a cheese milk containing a substantial amount of polyol fatty acid polyester, such polyester need be dispersed into an aqueous system containing milk proteins such as casein. Futhermore, in order to obtain a cheese product of acceptable quality, it is necessary that such polyester be dispersed into the cheese milk in the form of very small oil droplets. Such a fine dispersion generally can only be achieved by using conditions of high shear. Such conditions of high shear, however, have a clearly negative influence on the structure of the final cheese product.

By first preparing a filled milk in which (at least the major part of) the polyol fatty acid polyester is dispersed by using conditions of high shear, and subsequently combining the filled milk with an aqueous composition containing a substantial amount of milk protein, the milk proteins present in the latter aqueous composition are only subjected to such conditions of shear as are needed to obtain a homogeneous cheese milk composition. Consequently the milk proteins present in the aqueous composition, due to the fact that they have not been subjected to high shear, retain the characteristics which incur the desired structure and texture to the eventual cheese product.

Steps (a) and (b) of the present process can suitably be carried out separately, for instance by simply adding the fatty composition to the aqueous composition and homogenizing the mixture so obtained in a suitable homogenizing device. Alternatively, however, steps (a) and (b) can be carried out simultaneously, e.g. by injecting the oil into the aqueous composition through a nozzle under very high pressure.

In order to obtain a cheese product having a very favourable texture, the cheese milk of step (c) should comprise oil and milk protein in a weight ratio in the range of 4.5:1 to 1:2.5. Accordingly, in a preferred embodiment of the invention, the filled milk and the aqueous composition are admixed in such a ratio that the cheese milk obtained contains oil and milk protein in a weight ratio in the range of 4.5:1 to 1:2.5.

Generally, in the present process the cheese milk is prepared by combining the filled milk and the aqueous composition in a weight ratio in the range of 1:20 to 3:1. Preferably the filled milk and the aqueous composition are combined in a weight ratio in the range of 1:15 to 2:1, most preferably in the range of 1:12 to 1:1.

The cheese milk used in the present process should contain sufficient milk protein to produce a adequate product structure as well as an acceptable texture. Generally the present cheese milk contains from 3.0 to 10 wt. %, preferably from 3.2 to 6 wt. % milk protein. The cheese milk used in the present process preferably contains at least 2.0 wt. % casein. According to another preferred embodiment the cheese milk contains from 1.0 to 10 wt. %, preferably from 1.4 to 6 wt. % fat.

In this specification, unless otherwise indicated, the term 'fat' refers to edible fatty substances in a general sense, including natural or synthesized fats and oils consisting essentially of triglycerides such as, for example, soybean oil, sunflower oil, palm oil, coconut oil, fish oil, butter oil, lard and tallow, which may have been fractionated, interesterified, partially or completely hydrogenated or modified otherwise, as well as non-toxic fatty materials having properties similar to triglycerides, which materials can be indigestible, such as for example waxes, e.g. jojoba oil and hydrogenated jojoba oil, and polyol fatty acid polyesters referred to hereinafter in more detail. The terms fat and oil are used interchangeably.

In this specification the term 'polyol' is intended to refer to any aliphatic or aromatic compound which comprises at least four free hydroxyl groups. Such polyols in particular include the group of sugar polyols, which comprises the sugars, i.e. the mono-, di- and polysaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, lactose, cellobiose, raffinose, sucrose, erythritol, mannitol, lactitol, sorbitol, xylitol and alpha-methylglucoside. A generally used sugar polyol is sucrose.

In this specification the term 'polyol fatty acid polyester' is intended to refer to any such polyesters or mixtures thereof of which, on an average, more than 70% of the polyol hydroxyl groups have been esterified with fatty acids.

In this specification by 'indigestible' is meant that at least about 70% by weight of the material concerned is not digested by the human body.

The aqueous composition of step (a), although it may be of non-dairy origin, preferably is, at least partly, of dairy origin, and contains only a limited amount of fat. Accordingly in a preferred embodiment, the aqueous composition used in step (a) is of dairy origin, contains less than 3 wt. % milk fat and at least 1 wt. % milk protein. According to an even more preferred embodiment the aqueous composition is of dairy origin and consists essentially of skim milk, milk, buttermilk, whey or mixtures thereof.

According to yet another preferred embodiment the fatty composition of step (a) comprises more than 80 wt. % oil, the oil consisting of at least 50 wt. % polyol fatty acid polyester and 0–50 wt. % triglycerides containing less than 40%, preferably less than 20%, saturated fatty acid residues.

In order to obtain a cheese product having a very good texture, it is advisable to homogenize the water and oil containing mixture under such condition that the filled milk obtained has an average oil droplet size of less than 12 microns. The droplet size of the filled milk can suitably be measured by means of a Coulter Counter TM particle size analyzer.

We have found it advantageous to prepare the filled milk of step (b) by injecting the fatty composition into an aqueous composition at a very high pressure difference. Accordingly, preferably the filled milk is prepared by injecting the fatty composition into the aqueous composition at a pressure difference of at least 60 atmospheres, Since the fatty composition should be essentially liquid when injected into the aqueous composition and can suitably comprise a substantial amount of high melting polyol fatty acid polyesters, preferably the fatty composition upon injection into the aqueous composition has a temperature of more than 60° C., more preferably of more than 80° C.

In U.S. Pat. No. 3,889,004 a process for preparing edible emulsions is described, in which process one liquid phase is injected into another liquid phase at a pressure difference of at least 100 atmospheres and with a pressure in the second liquid of at least 0.3 atmospheres. It is described to prepare a filled milk by injecting fat blends of vegetable origin into skimmed milk and further process such filled milk to a cheese product.

In a preferred embodiment of the present invention the process comprises the coagulation of a cheese milk containing a substantial amount of a triglyceride oil low in saturated fatty acid residues, as the consumption of relatively large amounts of such fatty acid residues is known to increase the cholesterol content of the blood and can thus promote the risk of heart and vascular diseases. Accordingly, in the present process the fatty composition comprises more than 80% by weight of in combination polyol fatty acid polyesters and triglycerides containing less than 40%, preferably less than 20%, saturated fatty acid residues. Preferably the fatty composition contains at least 50 wt. % polyol fatty acid polyester. Furthermore, preferably, the triglycerides present in the cheese milk contain more than 15%, more preferably more than 25% of poly unsaturated fatty acid residues.

By fatty acid residues, whenever referred to in this application, unless indicated otherwise, are meant those fatty acid residues which are digestible, i.e. those fatty acid residues which can be converted to free fatty acid upon digestion. Thus the term fatty acid residues as used in this application, for instance, encompasses fatty acid residues in triglycerides, as well as in mono- and di-glycerides, but not fatty acid residues as present in, for example, sucrose octaester of fatty acids.

The utilization of cheese milk containing, in combination, polyol fatty acid polyesters and triglycerides low in saturated fatty acid polyesters, offers the advantage that the consumption of the cheese product obtained by the present process, has a blood-cholesterol lowering effect and moreover does not tend to oil out. Indeed, to obtain a cheese product that does not exhibit oil-exudation, but at the same time contains a substantial amount of triglycerides low in saturated fatty acids, according to the teachings of the art, it is advisable to employ a so called hardstock consisting of high melting triglycerides rich in saturated fatty acid residues.

The introduction of high melting polyol fatty acid polyols into the filled milk in combination with a triglyceride oil having a low content of saturated fatty acid residues, thus enables the preparation of a cheese product comprising a very limited amount of saturated fatty acid residues and yet showing no oil exudation, not even when stored at higher temperatures and under strongly varying temperature regimes. Another advantage of the introduction of polyol fatty acid polyesters as compared to the introduction of other non-dairy fats and oils is that the former components do not generate off-flavours during production and storage of the cheese product.

The cheese milk used in the present process can contain essentially no milk fat, for example if the aqueous composition of step (a) is tap water, containing ingredients such as milk protein, and the fatty composition is a fat blend of non-dairy origin. Preferably, the total fat present in the cheese milk comprises less than 70 wt. %, more preferably 5-60 wt. % milk fat as thus the amount of saturated fatty acid residues in the filled milk can be kept rather low, and moreover a positive flavour contribution is obtained from the remaining milk fat.

We have found that the advantages of the present invention are most appreciated in cheese products wherein at least almost half of the milk fat has been replaced by polyol fatty acid polyester. Replacement of all milk fat by polyol fatty acid polyester can yield products having an acceptable structure and texture, but displaying a rather bland flavour. Accordingly, in a preferred embodiment, the cheese milk prepared in step (c) comprises triglycerides and polyol fatty acid polyester in a weight ratio in the range of 45:55 to 15:85.

Although the cheese milk used in the present process can suitably be concentrated to the fat and protein content desired in the finished product, preferably the cheese milk comprises from 1.2-4.5 wt. % of fat. The coagulant applied in the present process preferably is rennet or rennin.

In case the fatty composition of step (a) is composed of two or more different components, these components can be combined together first and subsequently be combined with the aqueous composition of step (a), or alternatively said components can be combined with the aqueous phase successively. Both procedures are covered by the present application. Likewise the present application also encompasses the subsequent addition to the fatty composition of separate components of the aqueous composition of step (a).

In another preferred embodiment of the present process the fatty composition contains at least 50 wt. % polyol fatty acid polyesters and the aqueous composition is of dairy origin, containing 1-6 wt. % milk fat. The cheese product so obtained contains polyol fatty acid polyesters in addition to milk fat, yielding a product of good quality. In particular if the fat in the cheese milk essentially consists of milk fat and polyol fatty acid polyester, very good cheese products can be obtained. Preferably the cheese milk used in the process according to this preferred embodiment contains milk fat and polyol fatty acid polyester in a weight ratio in the range of 2:1 to 1:4.

It is surprising that even the introduction of substantial amounts of polyol fatty acid polyesters in the filled milk can eventually give a cheese product that has an appearance, consistency and taste that is indistinguishable from a similar high quality product exclusively prepared from dairy ingredients. It is believed that this surprisingly high quality is the result of the fact that the polyol fatty acid polyesters remain unmodified during the production and storing process and thus do not generate other components which adversely affect the product structure and/or taste. Thus, for instance, the cheese flavour of the final product originates solely from the milk fat and other dairy ingredient present in the original cheese milk.

We have found it advantageous to prepare a cheese product by the process according to the invention employing a cheese milk wherein the fat present has an $N_{10}$ value of more than 15, preferably of more than 25. Cheese products comprising fat having such a relatively high $N_{10}$ value appear to have a favourable consistency and do not tend to loose oil, not even under extreme conditions. Preferably the $N_{10}$ value of the fat in the cheese milk is more than 30 and the $N_{40}$ value of the same fat is less than 15. The fat present in the cheese milk moreover, preferably, has a slip melting point of more than 32° C.

The present process can be used to prepare several types of cheese products like soft cheeses (cottage cheese, cream cheese, Neufchatel etc.), semi-hard cheeses (Gouda, Edam, Tilsit, Limburg, Lancashire etc.) and hard cheeses (Cheddar, Gruyere, Parmesan etc.), external mould cheeses (Camembert, Brie etc.) and internal mould cheeses (Roquefort, Gorgonzola etc.).

Another aspect of the present invention is a cheese product obtainable by a process according to the present invention.

Yet another aspect of the present invention is a cheese product containing more than 2 wt. % of a blend of polyol fatty acid polyesters having a slip melting point of more than 37° C. and more than 8 wt. % triglycerides, said triglycerides containing less than 40%, preferably less than 20%, saturated fatty acid residues, the total fat present in the cheese having an $N_{10}$ value of more than 15. The total fat present in the cheese, preferably, has an $N_{10}$ value of more than 15. According to another preferred embodiment, the present cheese product is extremely enriched in unsaturated fatty acid residues and contains unsaturated and saturated fatty acid residues in a weight ratio of at least 2.5, more preferably of at least 3.5. Such products can advantageously be consumed by people having too high a blood-cholesterol content in order to decrease said cholesterol content.

The last aspect of the present invention concerns a cheese product containing more than 4 wt. % polyol fatty acid polyesters and more than 6 wt. % triglycerides, the total fat present in the cheese having an $N_{10}$ value of more than 15, preferably of more than 25, and essentially all triglycerides originating from milk fat. Preferably the cheese product contains polyol fatty acid polyesters and triglycerides in a weight ratio in the range of 4:1 to 1:2. Such products can be of excellent quality and indistinguishable from products prepared solely from dairy ingredients.

The cheese products according to present invention preferably comprise fat and other dry matter in a ratio that is normally encountered in traditional cheese products of the same type. It is important that the fat in dry matter content does not become too high as in that case insufficient casein is available to give the cheese product the appropriate texture. Thus preferably the present cheese product contains less than 65 wt. % fat on dry matter. The cheese products according to the invention normally contain from 30-65 wt. % dry matter.

The cheese products encompassed by the present invention range from soft cheeses to hard cheeses of the various types illustratively referred to above. The present cheese products can furthermore suitably be employed in the manufacture of various types of processed cheese, such as cheese spreads, sliceable cheeses etc.

The invention is illustrated by means of the following example:

EXAMPLE 1

A soft ripened cheese of the Camembert type containing 45% fat in dry matter wa prepared as follows:

A filled milk containing 3.5 wt. % fat was prepared by injecting sucrose polyesters of fatty acids derived from fully hardened soybean oil having a slip melting point of 65° C. (55%), and touch-hardened soybean oil having a slip melting point of 28° C. (45%), the sucrose polyesters being esterified to a degree of 95%, into skim milk (0.2 wt. % fat) containing 0.5 wt. % Lygomme INX (starch based thickening agent). The sucrose polyester stream was injected in the same direction as the skim milk stream, utilizing a pressure difference of 250 bar. Upon injection the sucrose polyester stream had a temperature of 120° C. and the skim milk had a temperature of 40° C. The nozzle used comprised one hole having a diameter of 0.7 mm and was characterized by a spray angle of 70 degrees.

The filled milk was cooled to 10° C. and combined with milk (3.5 wt. % fat) and skim milk in such ratios that the filled milk obtained had a fat content of 3 wt. % and contained sucrose polyester and triglycerides in a weight ratio of about 3:1. The milk was stored at a temperature of 6° C. for one day.

The milk was then heated to 34° C. and subsequently 0.015 wt. % $CaCl_2$, a suspension of *Penicillium candidum* and 1.5% of a mesophilic starter culture were added. When an acidity of 7.4 .SH was reached, rennet was added to the milk. The following steps of cutting the curd, moulding and salting did not differ from conventional Camembert production. After a ripening time of 12 days at 17° C. and 85-90% humidity, the resulting Camembert cheese in which about 75%, of the milk fat had been replaced by sucrose polyester of fatty acids, was of a quality comparable to traditional dairy Camembert cheese.

EXAMPLES 2-4

Soft ripened Camembert cheese products containing 45% fat in dry matter, which fat comprised 50%, 75% or 94% of sucrose fatty acid polyester, were prepared as follows:

A filled milk containing 3.5 wt. % fat was prepared by heating skim milk (0.2 wt. % fat) to 65° C., adding 0.5 wt. % Lygomme INX (starch based thickening agent) and admixing sucrose polyester, using an Ultra Turrax TM mixer. The coarse emulsion so obtained is further homogenized by means of a Rannie TM homogenizer operated at 20 bar. Before homogenization some lactoflavine and carotene were added in an amount sufficient to obtain a filled milk having the colour of dairy milk. The sucrose polyester comprised fatty acids derived from fully hardened soybean oil having a slip melting point of 65° C. (55%), and touch-hardened soybean oil having a slip melting point of 28° C. (45%), the sucrose polyesters being esterified to a degree of 95%. After homogenization the filled milk was cooled down to 15° C. and combined with milk (3.5 wt. % fat) and skim milk in such ratios that the filled milk obtained had a fat content of 3 wt. % and contained sucrose polyester and triglycerides in respective weight ratios of about 50:50, 75:25 and 94:6.

The filled milk was further processed to a Camembert cheese product in the same way as described in Example 1. The Camembert cheese product containing 50% sucrose polyester by weight of total fat, according to an expert test panel, had a sensorial quality comparable to that of a 100% milk fat product. The other two cheese products were found to have an atypical flavour and tended to have a rather firm consistency.

EXAMPLES 5-7

Examples 2-4 were repeated using a sucrose polyester obtained through esterification of sucrose with fatty acids derived from a blend of palm kernel oil fully hardened to a slip melting point of 39° C. (62%) and palm oil fully hardened to a slip melting point of 58° C. (38%). The Camembert cheese products so obtained essentially displayed the same product characteristics 15 as the corresponding products described in Examples 2-4, except that the texture of these products was even smoother, probably due to the fact that the sucrose polyester used had a lower melting point than the polyester utilized in Examples 2-4.

EXAMPLES 8-10

Gouda cheese products containing about 50% fat in dry matter were prepared, using the following method:

Filled milk containing about 10 wt. % fat was prepared by injecting at 1.8 kg/min. fat (having a temperature of 86° C.) into a skim milk stream (48° C. / 1100 liter/hr.). The fat stream was injected in the same direction as the skim milk stream, utilizing a pressure difference of 200 bar. The nozzle used was the same as described in Example 1.

By means of the above injection process filled milk compositions were prepared containing dispersed fat phases of different origin. The fat compositions used consisted of (1) pure sucrose polyester, (2) a 3:2 blend of sunflower oil and sucrose polyester and (3) a 3:1 blend of sunflower oil and sucrose polyester. The filled milk composition all had an average oil droplet size, as measured by means of a Coulter Counter TM analyzer, in the range of 3-7 microns.

The sucrose polyester (SPE) used had been esterified to a degree of more than 95% with fatty acids derived from fully hardened soybean oil having a slip melting point of 65° C. (55%), and touch-hardened soybean oil having a slip melting point of 28° C. (45%).

The filled milk compositions described above were blended with skim milk, and optionally full fat milk and cream so as to produce a cheese milk comprising about 3.4 wt. % fat and about the same amount of milk protein. Three different cheese milk compositions were thus prepared, comprising a fat phase of the following composition (in wt. %):

| Cheese milk | SPE | Sunflower oil | Milk fat |
| --- | --- | --- | --- |
| A | 60 | | 40 |
| B | 30 | 45 | 25 |
| C | 25 | 75 | |

To the above filled milk compositions 0.02 wt. % $CaCl_2$, 0.01 wt. % potassium nitrate and 0.002 wt. % colouring agent E 160 b (Annato TM, ex C.S.K., the Netherlands) were added. The vat milk was inoculated with 0.8 wt. % starter culture (Wiesby Probat 505, W-Germany), warmed to a temperature of 31° C. after which 0.02 wt. % calf-rennet (ex. C.S.K., the Netherlands, strength 1:10,000) was added. After 35 minutes the vat milk had coagulated and was cut. The whey was drained off after which the coagulum was scalded at 34° C. for 28 minutes, under stirring.

Again the whey was drained off and the coagulum was moulded into 5 slabs of about 7.2 kg each. The coagulum had a ph of about 5.4. The slabs were pressed and subsequently plunged into a salt bath (12° C., 18° Be., pH 4.8) and kept in there for 40 hours. The slabs taken from the salt bath had an average weight of 6.1 kg and were wrapped into a water-permeable foil (Wipak PAE 2065, ex WIPAK, Maastricht, the Netherlands) and stored at 13°-14° C. for 8 weeks.

The products were evaluated by an expert panel who found that all three products were of acceptable quality. Cheese product A was judged to possess the best flavour and consistency. Products B and C were found to be of similar quality, except that product B was found to have a slightly better flavour and product C was deemed to be substantially softer than product B.

Analysis of the cheese products showed the following results:

| Cheese Product | Fat | Moisture | Salt | pH |
|---|---|---|---|---|
| A | 31 | 40 | 1.7 | 5.3 |
| B | 31 | 42 | 1.7 | 5.3 |
| C | 31 | 41 | 1.5 | 5.3 |

EXAMPLE 11

The filled milk composition obtained after injection of pure sucrose polyester into skim milk as described in Examples 8-10, was combined with full fat milk and cream so as to obtain a filled milk containing 1.52 wt. % fat and 3.5 wt. % milk protein.

A Gouda cheese product was prepared from this filled milk using the method described in Examples 8-10, except that 0.02 wt. % potassium nitrate was added.

The cheese product obtained was analyzed and found to contain 19.0 wt. % fat, 46.8 wt. % moisture, 1.7 wt. % salt. The pH of the product was 5.4.

As compared to the cheese products described in Examples 8-10, the low fat cheese product had a worse consistency and flavour. However, taking into account the low amount of fat present in the product, its quality was relatively good.

EXAMPLES 12-15

Three creams A, B and C, containing about 30 wt. % sucrose polyester were prepared using the following method:

The sucrose polyester material was heated to 65° C. and mixed into skim milk previously heated to 60° C., using an Ultra Turrax TM mixer. The emulsion so obtained had a rather coarse oil droplet distribution. 2 liters of this coarse emulsion were homogenized at a throughput of 60 kg/hr, using a Rannie TM homogenizer. The homogenizer was operated at a pressure drop of 20 bar. The homogenization time was 5 minutes and the temperature of the homogenized emulsion was about 60° C.

The average oil droplet size of the three creams was measured using a Coulter Counter TM particle size analyzer. The average droplet size of each cream was found to be about 4 microns.

The following sucrose polyester compositions were used in the preparation of creams A, B and C:

| Cream A: | Sucrose fatty acid polyester wherein fatty acid residues are derived from 55% fully hardened soybean oil, slip melting point 65° C., and 45% touch-hardened soybean oil, slip melting point 28° C.; degree of esterification over 95% |
| Cream B: | sucrose fatty acid polyester wherein the fatty acid residues are derived from soybean oil hardened to a slip melting point of 28° C.; degree of esterification over 95% |
| Cream C: | sucrose fatty acid polyester wherein the fatty acid residues are derived from 62% fully hardened palm kernel oil, slip melting point 39° C., and 38% fully hardened palm oil (slip melting point 58° C.); degree of esterification over 95% |

The respective cream compositions A, B and C were admixed with skim milk, milk and cream so that cheese milk compositions A, B and C were obtained, each cheese milk composition containing 3.4 wt. % fat. Creams A, B and C were admixed with the other dairy compositions in such ratios that the fat phase of the cheese milk compositions consisted of 40 wt. % milk fat and 60 wt. % sucrose polyester.

In addition to the above cheese milk compositions cheese milk composition D was prepared from the same ingredients and in the same manner as cheese milk composition A described in Examples 8-10. Gouda cheese products were produced from cheese milk compositions A, B, C and D in exactly the same manner as described in Examples 8-10.

The cheese products obtained were evaluated by an expert test panel who found that all three products were of a satisfactory quality. Cheese product C was judged to possess the best flavour and consistency. Products A and D were found to be very similar, except that product D was found to be somewhat firmer than product A. Product C was deemed to be have a better flavour than products A and D, but had a consistency that was slightly worse than the other products.

We claim:

1. Process for preparing a cheese product containing polyol fatty acid polyesters, comprising the following steps:
   (a) preparing a water and oil containing mixture comprising from 1.2-40 wt. % oil, by combining a fatty composition containing at least 40% polyol fatty acid polyesters by weight of oil with an aqueous composition,
   (b) homogenizing said mixture so as to obtain a filled milk having an average oil droplet size of less than 20 microns,
   (c) preparing a cheese milk by combining the filled milk of step (b) and an aqueous composition containing at least 2 wt. % milk protein,
   (d) adding a starter culture and/or coagulant to the cheese milk and leaving it to coagulate
   (e) separating the whey from the curd.

2. Process according to claim 1, wherein the homogenized mixture and the aqueous composition are admixed in such a ratio that the cheese milk contains oil and milk protein in a weight ratio in the range of 4.5:1 to 1:2.5.

3. Process according to claim 1, wherein the cheese milk contains from 3.0 to 10 wt. % milk protein.

4. Process according to claim 1, wherein the cheese milk contains from 1.0 to 10 wt. % fat.

5. The process according to claim 1, wherein the aqueous composition used in step (a) consists essentially of skim milk, milk, buttermilk, or whey or mixtures thereof and contains less than 3 wt. % fat and at least 1 wt. % milk protein.

6. Process according to claim 1, wherein the fatty composition of step (a) comprises more than 80 wt. % oil, at least 50 wt. % polyol fatty acid polyester and 0-50 wt. % triglycerides containing less than 40% saturated fatty acid residues.

7. Process according to claim 1, wherein the filled milk obtained after the homogenization of step (b) has an average oil droplet size of less than 12 microns.

8. Process according to claim 1, wherein the cheese milk prepared in step (c) comprises triglycerides and polyol fatty acid polyester in a weight ratio in the range of 45:55 to 15:85.

9. Cheese product obtainable by a process according to claim 1.

10. The process according to claim 1 wherein after step (d) and before step (e) the coagulum is cut to provide curd particles in whey.

11. The process according to claim 3, wherein the cheese milk contains from 3.2 to 6 wt. % milk protein.

12. The process according to claim 4, wherein the cheese milk contains from 1.4 to 6 wt. % milk protein.

13. The process according to claim 6, wherein the fatty composition of step (a) comprises 0-50 wt. % trigylcerides containing less than 20% saturated fatty acid residues.

14. A cheese produce containing 30-65 wt. % dry matter and less than 65 wt. % fat on a dry matter basis and containing more than 2 wt. % of a blend of polyol fatty acid polyesters having a slip melting point of more than 37° C. and more than 8 wt. % triglycerides, said triglycerides containing less than 40% saturated fatty acid residues, the total fat present in the cheese having an $N_{10}$ value of more than 15.

15. The cheese product according to claim 14 comprising less than 20% saturated fatty acid residues.

16. The cheese product according to claim 14 wherein the cheese is of the type selected from the group consisting of soft cheese, semi-hard cheese, hard cheese, external mold cheese, internal mold cheese and processed cheese.

17. A cheese product containing 30-65 wt. % dry matter and less than 65 wt. % fat on a dry matter basis and containing more than 4 wt. % polyol fatty acid polyesters and more than 6 wt. % triglycerides, the total fat present in the cheese having an $N_{10}$ value of more than 15 and essentially all triglycerides originating from milk fat.

18. The cheese product according to claim 17 wherein the cheese is of the type selected from the group consisting of soft cheese, semi-hard cheese, hard cheese, external mold cheese, internal mold cheese and processed cheese.

* * * * *